United States Patent
Mopur et al.

(10) Patent No.: US 8,041,543 B2
(45) Date of Patent: Oct. 18, 2011

(54) INPUT/OUTPUT WORKLOAD ANALYSIS METHOD AND SYSTEM FOR A STORAGE AREA NETWORK

(75) Inventors: Satish Kumar Mopur, Bangalore (IN); Karthigeyan Kasthurirengan, Bangalore (IN); Vivek Mehrotra, Bangalore (IN); Vijay Kumar, Bokaro Steel (IN); Mukesh Gupta, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 217 days.

(21) Appl. No.: 12/332,358

(22) Filed: Dec. 11, 2008

(65) Prior Publication Data
US 2010/0107013 A1    Apr. 29, 2010

(30) Foreign Application Priority Data
Oct. 23, 2008   (IN) .......................... 2595/CHE/2008

(51) Int. Cl.
*G06F 12/00* (2006.01)
*G06F 11/34* (2006.01)

(52) U.S. Cl. ........... 702/186; 702/183; 702/188; 714/42
(58) Field of Classification Search ................. 702/186, 702/183, 188
See application file for complete search history.

(56) References Cited

U.S. PATENT DOCUMENTS

| | | | |
|---|---|---|---|
| 2005/0071596 A1* | 3/2005 | Aschoff et al. | 711/170 |
| 2007/0112870 A1* | 5/2007 | Korupolu et al. | 707/200 |
| 2008/0301204 A1* | 12/2008 | Chodacki et al. | 707/205 |

* cited by examiner

*Primary Examiner* — Hal Wachsman (57) ABSTRACT

A system and method of input/output (I/O) workload analysis of the components in a storage area network (SAN) are disclosed. In one embodiment, I/O workloads of components in the SAN are analyzed by determining host bus adapter (HBA) port to storage port oversubscription ratios as well as HBA port to inter-switch link (ISL) oversubscription ratios. A subset of the components for monitoring based on the HBA port to storage port oversubscription ratios and the HBA port to ISL oversubscription ratios is selected. The subset of the components is continuously monitored and the I/O statistics of the subset of the components are stored. Expected I/O workloads of the subset of the components are forecast based on current I/O workloads associated with the I/O statistics of the subset of the components and respective I/O workload threshold values of the subset of the components.

15 Claims, 8 Drawing Sheets

INPUT/OUTPUT WORKLOAD ANALYSIS METHOD AND SYSTEM FOR A STORAGE AREA NETWORK

RELATED APPLICATIONS

Benefit is claimed under 35 U.S.C. 119(a)-(d) to Foreign application Serial No. 2595/CHE/2008 entitled "INPUT/OUTPUT WORKLOAD ANALYSIS METHOD AND SYSTEM FOR A STORAGE AREA NETWORK" by Hewlett-Packard Development Company, L.P., filed on 23 Oct. 2008, which is herein incorporated in its entirety by reference for all purposes.

FIELD OF TECHNOLOGY

Embodiments of the present invention relate to the field of electronics. More particularly, embodiments of the present invention relate to a storage area network solution.

BACKGROUND

A business which subscribes to a storage area network (SAN) may scale up its storage area network (SAN) by adding or upgrading the hosts, fabric hardware, storage devices, and/or business applications to meet growing demands of the business. Hence, the input/output (I/O) traffic volume, pattern, and distribution in the SAN may undergo a complex change over time. This can cause a congestion and/or uneven distribution of I/O traffic in the SAN that are hard to detect, thereby noticeably degrading the performance of the SAN with time.

To improve the performance of the SAN, a trend analysis and/or forecasting may be performed based on the current configuration of the SAN. For example, some of currently existing solutions may support a trend analysis of the SAN on a per-component basis which allows the business to manually correlate current changes in the performance across the components due to possible changes in the configuration of the SAN's workload. However, the decision involving in the trend analysis, such as the extent and/or timing of the trend analysis, may be made by a whim of authorized personnel rather than by a systematic triggering event. Therefore, the decision may not result in the optimal analysis which leads to the most viable recommendation of the SAN performance upgrade.

BRIEF DESCRIPTION OF THE DRAWINGS

Embodiments of the present invention are illustrated by way of an example and not limited to the figures of the accompanying drawings, in which like references indicate similar elements and in which.

Other features of the present embodiments will be apparent from the accompanying drawings and from the detailed description that follow.

DETAILED DESCRIPTION

A system and method of input/output (I/O) workload analysis in a storage area network (SAN) is disclosed. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims. The terms "inter-switch links (ISLs)" and "fiber channel ISLs (FC ISLs)" are interchangeably used throughout the document.

Figure 1:
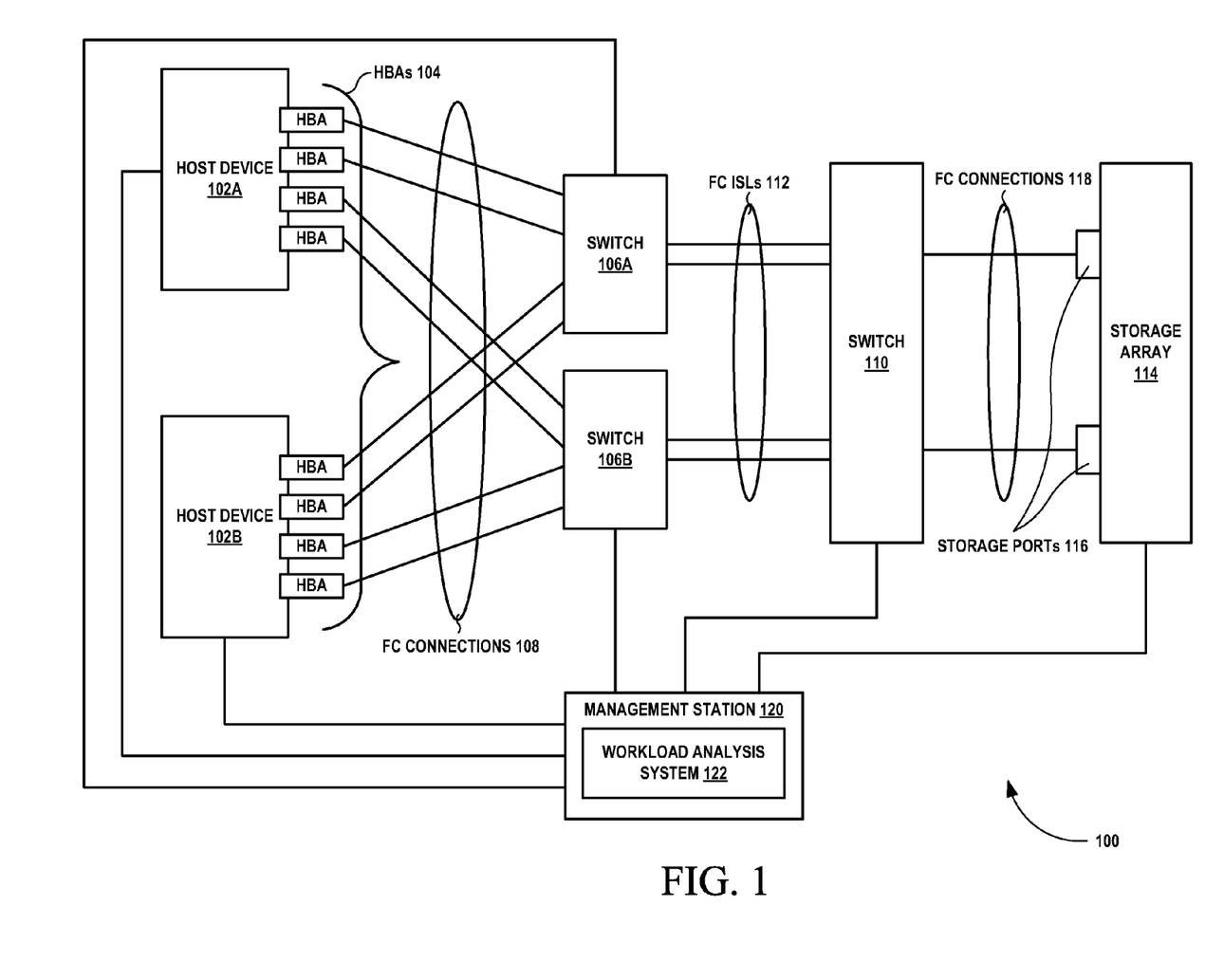
FIG. 1 is a block diagram of an exemplary storage area network (SAN) with a workload analysis system, according to one embodiment.

FIG. 1 is a block diagram of an exemplary storage area network (SAN) 100 with a workload analysis system 122, according to one embodiment. Particularly, FIG. 1 illustrates host devices 102A-B, a plurality of switches 106A-B and 110, a storage array 114, and the workload analysis system 122. In one example embodiment, the host device 102A may include a UNIX operating system (OS) based server, and the host device 102B may include a windows OS based server. Further, each of the host devices 102A-B includes a plurality of host bus adapters (HBAs) 104, and the storage array 114 includes a plurality of storage ports 116. In addition, the workload analysis system 122 may reside in a management station 120.

Further as shown in FIG. 1, the plurality of HBAs 104 are connected to the plurality of switches 106A-B through fiber channel (FC) connections 108. In one example embodiment, one or more HBAs 104 can be connected to a switch through the different FC connections 108. Also, the plurality of storage ports 116 are connected to the switch 110 through FC connections 118. Furthermore, the switch 110 and the switches 106A-B are interconnected through FC inter-switch links (ISLs) 112. In addition, the SAN 100, including the host devices 102A-B, the storage array 114, and the plurality of switches 106A-B and 110, is communicatively coupled to the management station 120.

In one embodiment, the workload analysis system 122 (e.g., residing in the management station 120) analyzes input/output (I/O) workloads of components in the SAN 100. For example, the components may include the plurality of HBAs 104, the plurality of switches 106A-B and 110, and the plurality of storage ports 116. In one example embodiment, the components in the SAN 100 may be operated with negotiated data rates between them. For example, one of the HBAs 104 operating at 2 giga bits per second (GBps) may be connected to the switch 106A operating at 4 GBps, where the negotiated data processing rate may be the lower of the two components (2 GBps). In one example embodiment, data in each of the host devices 102A-B is stored into the storage array 114 via the HBAs 104, the switches 106A-B, the switch 110 and the storage ports which are connected by the FC connections 108 and 118, and the FC ISLs 112 as shown in FIG. 1.

In one embodiment, the workload analysis system 122 analyzes oversubscription ratios of the components in the SAN 100. Further, the workload analysis system 122 monitors the SAN 100 periodically with intelligence for usage analysis and connectivity changes. Furthermore, the workload analysis system 122 determines changes in SAN I/O trend on oversubscribed links over long periods of time at the FC connections 108 and 118 (e.g., fabric and storage connectivity). In addition, the workload analysis system 122 forecasts potential storage I/O traffic growth at the FC connections 108 and 118, and the FC ISLs 112, and enables planning for necessary upgrade of the SAN 100 in future.

Figure 2:
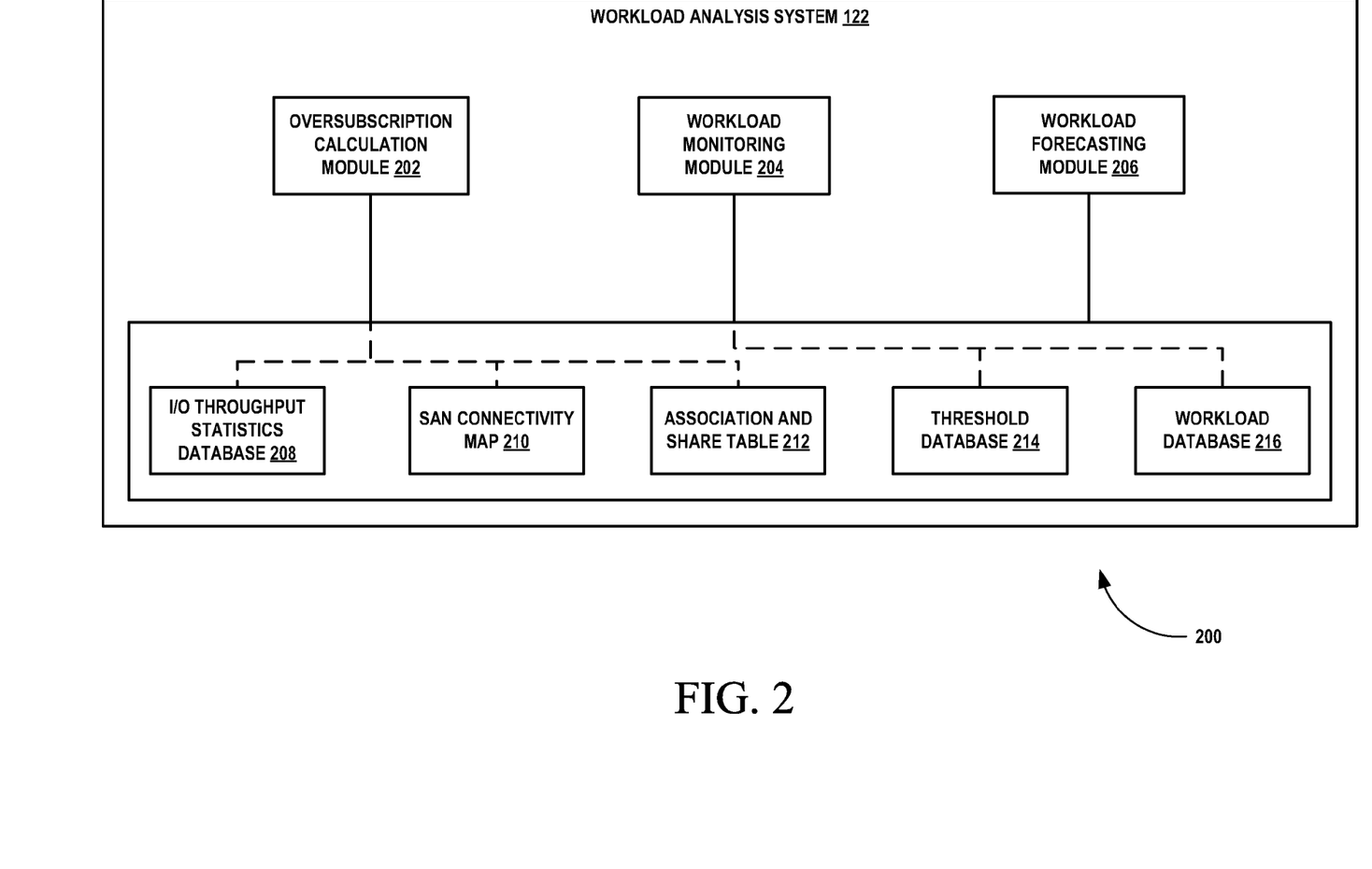
FIG. 2 is a block diagram of the workload analysis system of FIG. 1, according to one embodiment.

FIG. 2 is a block diagram 200 of the workload analysis system 122 of FIG. 1, according to one embodiment. Particularly, FIG. 2 illustrates an oversubscription calculation module 202, a workload monitoring module 204, and a workload forecasting module 206, according to one embodiment. In one example embodiment, the oversubscription calculation module 202, the workload monitoring module 204, and the workload forecasting module 206 reside in the management station 120. As explained above, the management station 120 is communicatively coupled to all the components in the SAN 100.

As shown in FIG. 2, the oversubscription calculation module 202 is associated with an I/O throughput statistics database 208 for storing I/O statistics of the components. Further, the oversubscription calculation module 202 is associated with a SAN connectivity map 210 for storing SAN connectivity information of the components. In one example embodiment, the SAN connectivity information includes end-to-end SAN connections between the components of the SAN 100.

Furthermore, the oversubscription calculation module 202 is associated with an association and share table 212 for each storage port 116. In one example embodiment, the association and share table 212 for each storage port 116 is constructed with logical unit numbers (LUNs), the ISLs 112, trunks, and the HBAs 104 of each host device 102A-B in the SAN 100. The association and share table 212 may include one-to-one or one-to-many mapping. For example, a storage port may be visible to 2 HBAs on one host device, 4 HBAs on a different host device, with 4 ISLs. The preliminary format and details associated with the association and share table 212 can be found in "APPENDIX 1".

Further as shown in FIG. 2, the workload monitoring module 204 is associated with a threshold database 214 associated with current I/O workloads. Furthermore, the workload monitoring module 204 is associated with a workload database 216 for storing date and time stamps, and port identification of a subset of the components. In some embodiments, the components (e.g., the HBAs, the ISLs/trunks, and the storage ports) in the SAN 100 are uniquely identified using their respective component keys. For example, this identifier may contain world-wide name of the component being identified, and used to lookup and associate information between the association and share table 212, the threshold database 214 and the workload database 216.

In one embodiment, the over subscription calculation module 202 determines HBA port to storage port oversubscription ratios and HBA port to ISL oversubscription ratios in the SAN 100. In one example embodiment, a HBA to storage port oversubscription ratio ($I_{HBA\ to\ storage\ port}$) associated with a host device of the SAN is calculated by:

$$I_{HBA\ to\ storage\ port} = \frac{\sum_{i=1}^{n}(HPCi*Si)}{\sum_{i=1}^{m}(SPCi*Si)},$$

with the m and n being numbers of HBA ports and storage ports respectively with different negotiated data rates, the Si being one of the different negotiated data rates, the HPCi being a number of HBA ports operating at the Si, and the SPCi being a number of storage ports operating at the Si, say for HBAs on a host.

In another example embodiment, a HBA to ISL oversubscription ratio ($I_{HBA\ to\ ISL}$) associated with a host device is calculated by:

$$I_{HBA\ to\ ISL} = \frac{\sum_{i=1}^{n}(HPCi*Si)}{\sum_{i=1}^{m}(IPCi*Si)},$$

with the m and n being numbers of HBA ports and ISLs respectively with different negotiated data rates, the Si being one of the different negotiated data rates, the HPCi being a number of HBA ports operating at the Si, and the IPCi being a number of ISLs operating at the Si, say for HBAs on a host.

The workload monitoring module 204 selects the subset of the components for monitoring based on the HBA to storage port oversubscription ratios and the HBA to ISL oversubscription ratios since it prefers to monitor those components with larger oversubscription ratios. Further, the workload monitoring module 204 continuously monitors the subset of the components to obtain I/O statistics of the subset of components. Furthermore, the workload monitoring module 204 stores the I/O statistics of the subset of the components in the I/O throughput statistics database 208.

In one embodiment, the workload forecasting module 206 forecasts expected I/O workloads of the subset of the components based on the current and historical I/O workloads of the subset of the components and respective I/O workload threshold values of the subset of the components. In one example embodiment, the respective I/O workload threshold values of the subset of the components include a low I/O workload threshold band, a medium I/O workload threshold band, and a high I/O workload threshold band.

The preliminary format and details associated with the threshold database 214 can be found in "APPENDIX 3". The following table depicts one example of the I/O workload threshold values (range) for the low I/O workload threshold band, the medium I/O workload threshold band, and the high I/O workload threshold band. In the following table, WL_Thresh refers to workload threshold specified.

TABLE 1

| | |
|---|---|
| 1 | Low_Thresh_Band = 0 to WL_Thresh/3 |
| 2 | Medium_Thresh_Band = WL_Thresh/3 to 2 * WL_Thresh/3 |
| 3 | High_Thresh_Band = 2 * WL_Thresh/3 to WL_Thresh |

In some embodiments, the subset of the components for monitoring includes respective ones of the subset of the components with each of their workloads greater than the low I/O workload threshold band. The workload forecasting module 206 accesses the current I/O workloads of the subset of the components. In one example embodiment, the current I/O workloads of the subset of the components are date and time stamped.

Further, the workload forecasting module 206 computes differences between the current I/O workloads and the respective I/O workload threshold values of the subset of the components using moving average (MA) values relative importance of the current I/O workloads and a regression algorithm of the MA values on a timely basis (e.g., an hour and this time maybe tunable based on the SAN configuration and user requirements). The preliminary format and details associated with the workload database 216 can be found in "APPENDIX 2".

Figure 3A:
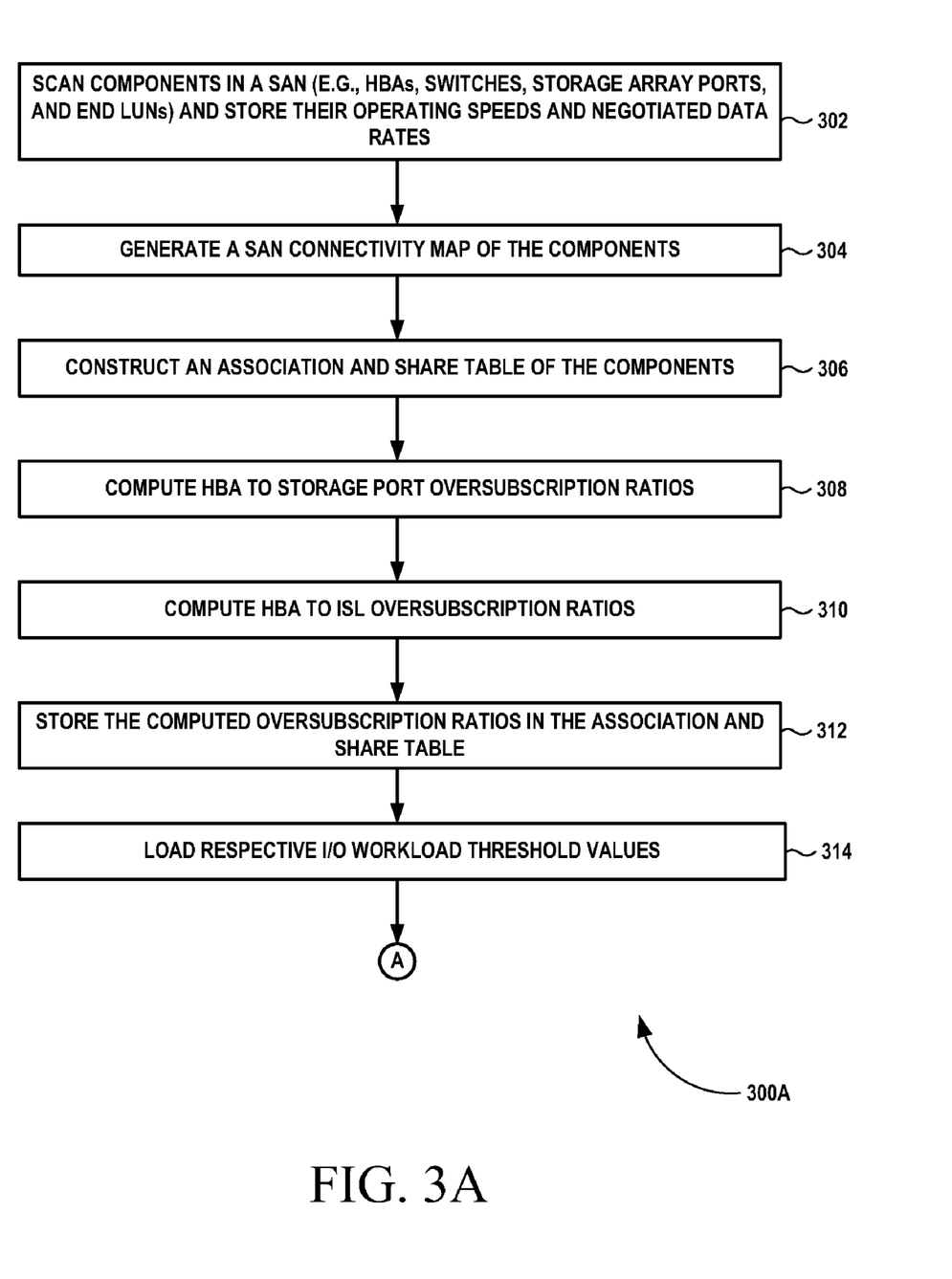
FIG. 3A illustrates a flow chart of an exemplary method for determining oversubscription ratios of components in the SAN of FIG. 1, according to one embodiment.

FIG. 3A illustrates a flow chart 300A of an exemplary method for determining oversubscription ratios of components in the SAN 100 of FIG. 1, according to one embodiment. In step 302, the components in the SAN are scanned to obtain their type (HBA, Switch, Storage Array), operating speed, negotiated data rate, and connectivity data to another component.

In one example embodiment, the components may include HBAs, switches, storage ports, LUNs, and operating speed, and/or negotiated data rate among the components based on their operating speed. In one exemplary implementation, the scanning is performed using simple network management protocol/storage management initiative specification (SNMP/SMI-S) and host agents. It is appreciated that the scanning of the components may be performed when a new component is added in the SAN or the scanning operation is called for by the workload analysis system 122 of FIG. 1.

In step 304, a SAN connectivity map of the components is generated based on the scanning of the components. In step 306, an association and share table of each storage port with the LUNs of a storage array, ISLs, trunks and the HBAs of each host device in the SAN is constructed. The association and share table may include one-to-one or one-to-many mapping. For example, a storage port may be connected to 2 HBAs on one host device, 4 HBAs on a different host device, with 4 ISLs.

The preliminary format and details associated with the association and share table 212 can be found in "APPENDIX 1". In step 308, HBA to storage port oversubscription ratios are computed using the negotiated data rate as discussed in FIG. 2. In step 310, HBA to ISL oversubscription ratios are computed using the negotiated data rate as discussed in FIG. 2. In step 312, the HBA to storage port oversubscription ratios and the HBA to ISL oversubscription ratios are stored in the association and share table. In step 314, respective I/O workload threshold values are loaded in a threshold database. In one example embodiment, the respective I/O workload threshold values of a subset of the components include a low I/O workload threshold band, a medium I/O workload threshold band, and a high I/O workload threshold band.

Preliminary format and details associated with the threshold database can be found in "APPENDIX 3". The above mentioned table 1 depicts the threshold values (range) for the low I/O workload threshold band, the medium I/O workload threshold band, and the high I/O workload threshold band.

Figure 3B:
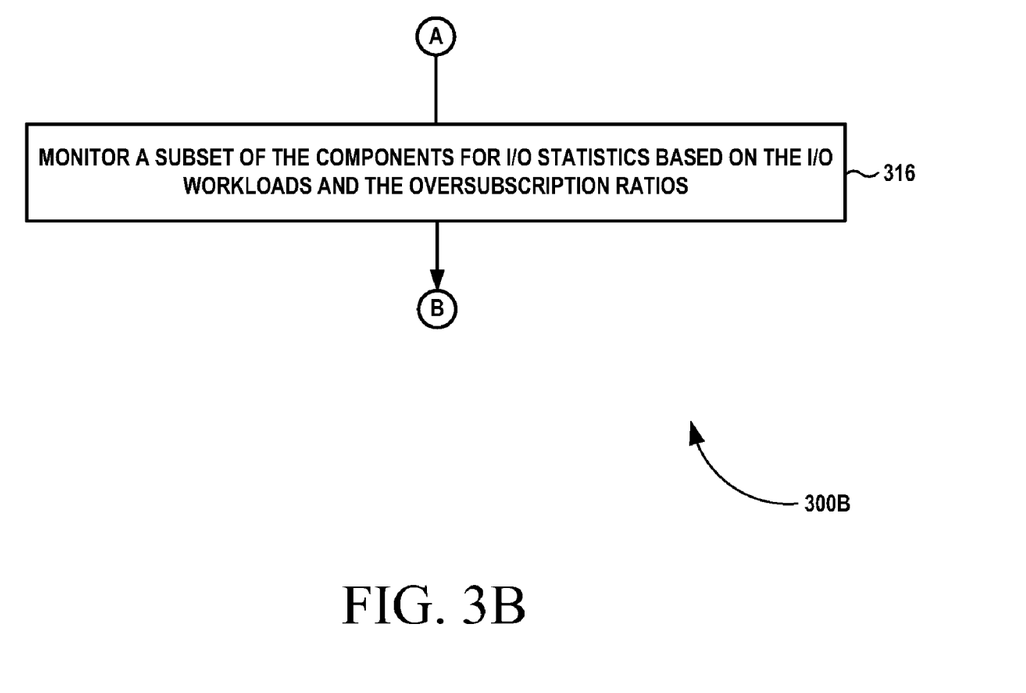
FIG. 3B illustrates a flow chart of an exemplary method for monitoring a selected subset of the components in the SAN of FIG. 1, according to one embodiment.

FIG. 3B illustrates a flow chart 300B of an exemplary method for monitoring a selected subset of the components (e.g., congested) in the SAN of FIG. 1, according to one embodiment. Particularly, FIG. 3B is a continuation of the flow chart 300A of FIG. 3A. In step 316, the subset of components are monitored based on current I/O workloads, and the oversubscription ratios (i.e., the HBA to storage port oversubscription ratios and the HBA to ISL oversubscription ratios). In one embodiment, the subset of the components is continuously monitored to obtain the I/O statistics of the subset of the components based on the current I/O workload. In one example embodiment, the subset of the components for monitoring includes respective ones of the subset of the components with each of their workloads greater than the low I/O workload threshold band.

In one exemplary implementation, continuously monitoring the subset of the components is performed at a sampling rate of 1 minute for a respective component if its HBA to storage port oversubscription ratio or its HBA to ISL oversubscription ratio is high (for example, greater than 7). In another exemplary implementation, continuously monitoring the subset of the components is performed by increasing the sampling rate for the respective component if its HBA to storage port oversubscription ratio or its HBA to ISL oversubscription ratio is greater than 7.

In accordance with the above described embodiments, the following points can be considered while monitoring the I/O statistics of the subset of the components.

- The lowest statistics sampling interval (Lowest_Samp_Interval) may be set to every 1 minute (i.e., highest sampling rate which may be tunable). The Lowest_Samp_Interval can be lesser depending on the ability of the granularity at which the I/O workload statistics are provided by the respective component. However, for long term analysis and trending, minimum granularity of about 30 seconds to 1 minute can be considered.
- The initial sampling interval may be set to 2*Lowest_Samp_Interval. This initial sampling interval is dynamically altered and is referred to as Current_Sampling_Interval per component.
- For the oversubscription ratios of the respective component greater than 7, Current_Sampling_Interval is used, and for the oversubscription ratios less than 7, the current sampling interval is linearly increased. This assumption is made based on the fact that lesser oversubscription ratios have relatively lesser probability of congestion.
- Monitoring of the I/O statistics of the subset of the components is not performed, unless the current I/O workloads associated with the respective components cross into the medium I/O workload threshold band.
- The Lowest_Samp_Interval can also be a configurable parameter, but a large value may tend to cause trending errors due to non-observation of lack of the I/O statistics in the Lowest_Samp_Interval.

The preliminary format and details associated with the workload database 216 can be found in "APPENDIX 2".

Figure 3C:
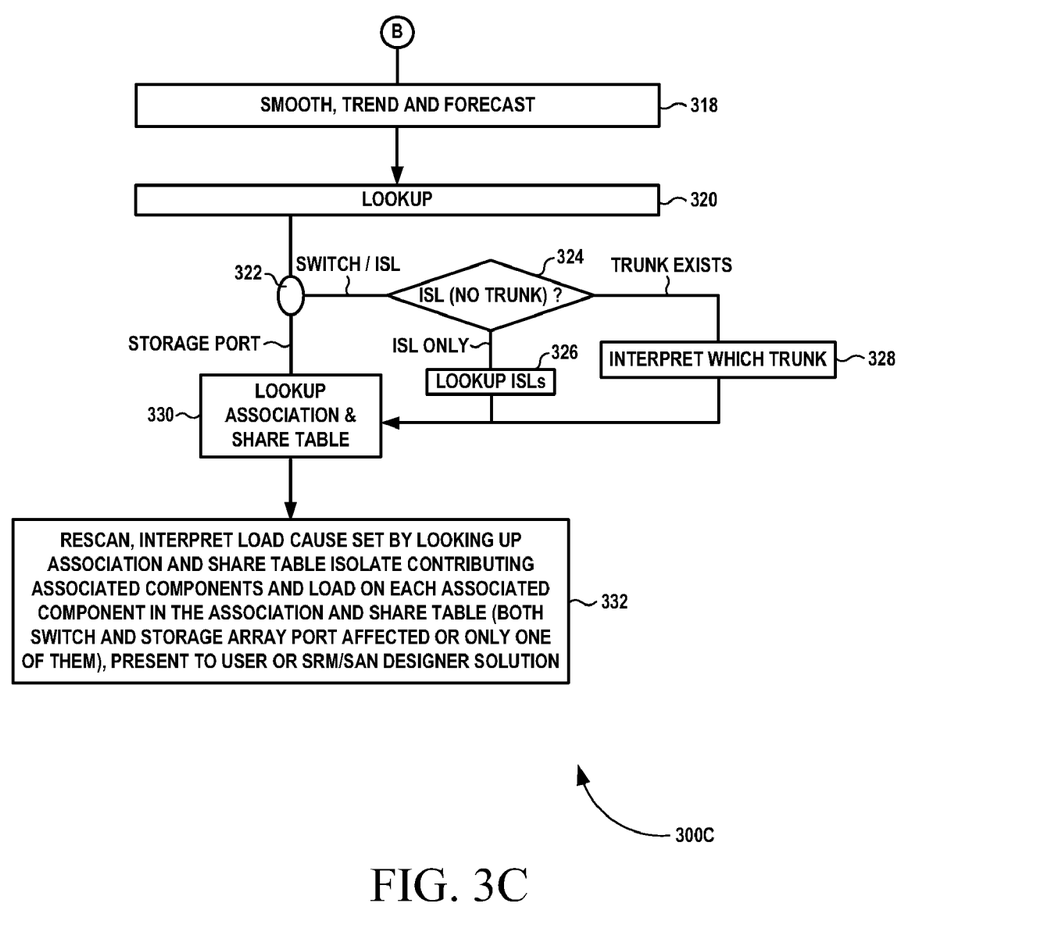
FIG. 3C illustrates a flow chart of an exemplary method for rectifying the congestion problem in the SAN of FIG. 1, according to one embodiment.

FIG. 3C illustrates a flow chart 300C of an exemplary method for rectifying the congestion problem in the SAN of FIG. 1, according to one embodiment. Particularly, FIG. 3C is a continuation of the flow chart 300B of FIG. 3B. In step 318, the expected I/O workloads of the subset of the components are obtained by performing smoothing, trending and forecasting of the current I/O workloads of the subset of the components which is detailed in FIG. 3D.

In step 320, a lookup operation is performed to determine corresponding changes associated with the components in the SAN. In step 322, a check is made to determine whether to monitor a storage port or a switch/ISL. In one example embodiment, for monitoring a storage port, the following contributing components need to be determined.

- List of ISL aggregates and trunks in the fabric (associated with the SAN) that route the I/O traffic to the storage port.
- List of HBAs communicatively coupled to the storage port, based on the current SAN configuration.

If the switch/ISL is to be monitored in step 322, then the process 300C goes to step 324 in which it is determined whether trunk exists or not. If the trunk does not exist, then the process 300C goes to step 326, else the process 300C goes to step 328. In step 328, a type of trunk is interpreted if the trunk exists. In one embodiment, for monitoring ISL aggregate or trunk (associated with steps 326 and 328 respectively), the following contributing components need to be determined.

List of ISL aggregates and trunks that route I/O traffic through the ISL or trunk.

List of HBAs in the fabric (associated with the SAN) whose I/O traffic is being routed through the ISL or trunk.

Further, the above mentioned contributing components are looked up in the association and share table as shown in step 330. In step 332, the components are rescanned, and the cause of the congestion may be interpreted by looking up the association and share table.

Further in step 332, the associated contributing components (i.e., the ISL aggregate/trunk and/or the storage port) and load on each associated contributing component in the association and share table are isolated. In one exemplary implementation, the contributing components are isolated based on I/O traffic history available in the workload database. In one example embodiment, the contributing components are isolated to determine the set of ISL aggregates and/or trunks that have contributed to the increase in the I/O traffic, and the set of HBAs and host devices that have contributed to the increase in the I/O traffic.

Furthermore in step 332, the following information is presented to a storage resource management/storage area network (SRM/SAN) designer solutions for proactive or corrective actions.

Storage port or ISL/trunk connectivity being analyzed.

Associated Mean_Time_to_Threshold (i.e. time taken to potentially reach threshold value).

Associated Thresh_Difference (i.e., difference between the current I/O workloads and the respective I/O workload threshold values).

Associated contributing HBAs and host devices, and end LUNS which could be potentially impacted.

MA trend data of the components in the SAN.

Further with reference to FIG. 3C, forecasting the expected I/O workloads further includes newly performing the determining the HBA to storage port oversubscription ratios and the HBA to ISL oversubscription ratios in the SAN if any of the MA values of an analyzed component is greater than a maximum workload threshold value. For example, the least one contributing component to the MA values of the analyzed component being greater than a maximum workload threshold value is determined using the association and share table and the current I/O workloads of the at least one contributing component.

Furthermore, forecasting the expected I/O workloads includes forwarding the subset of the components with the MA values greater than the maximum workload threshold value, its associated mean time to reach the maximum workload threshold value, its associated difference with the maximum workload threshold value, the at least one contributing component, and MA trends of the at least one contributing component.

Figure 3D:
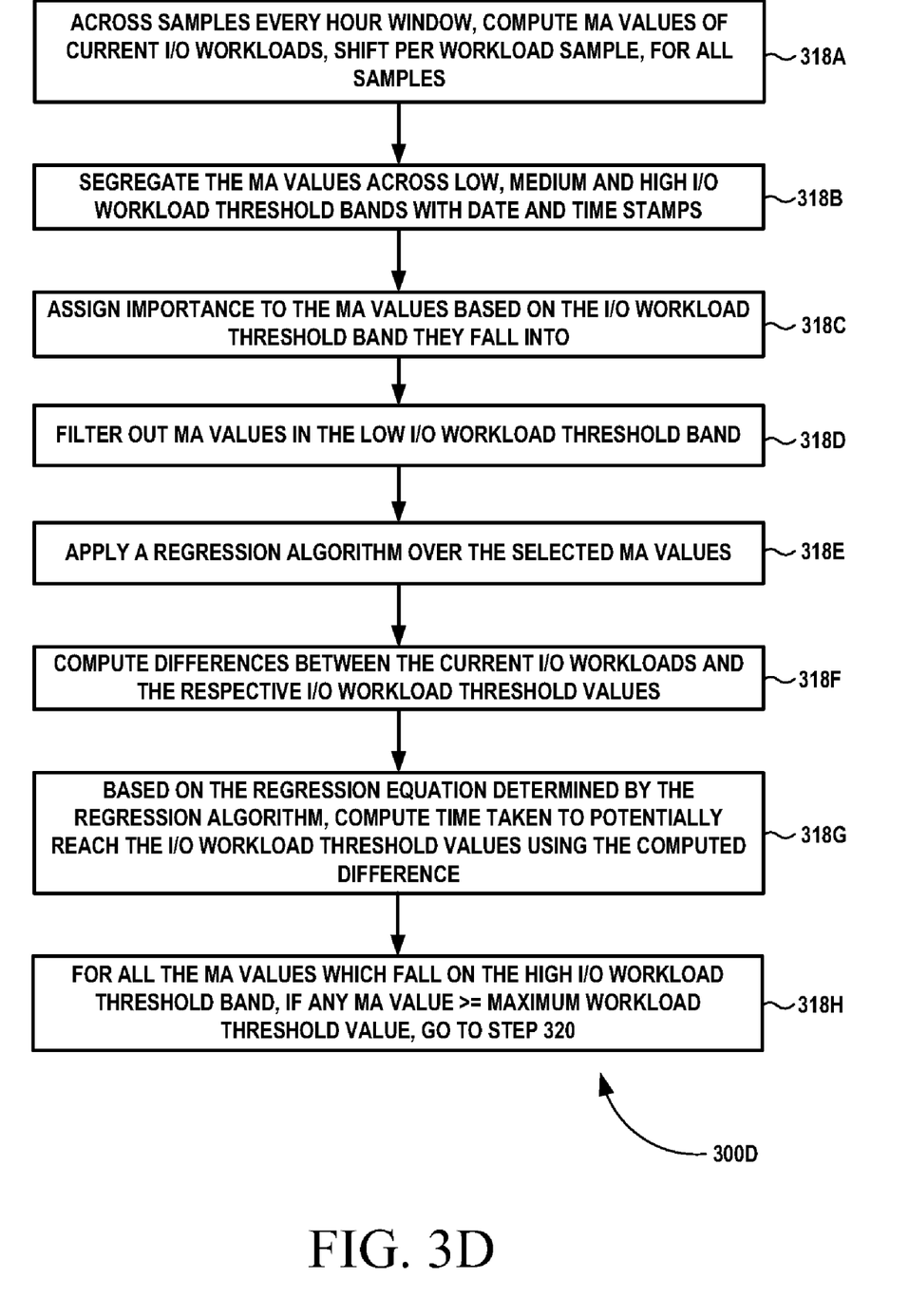
FIG. 3D illustrates a flow chart of the smooth, trend and forecast step of FIG. 3C, according to one embodiment.

FIG. 3D illustrates a flow chart 300D for the smooth, trend and forecast step 318 of the flow chart 300C in FIG. 3C, according to one embodiment. The following steps 318A to 318H are performed on each ISL, trunk and storage port that is being monitored every hour. In some embodiments, the ISL aggregate refers to the sum of the I/O statistics of the ISLs. This can also be applicable for ISL Trunks, where vendor-specific load balancing could be implemented, thereby necessitating an aggregation of port statistics for trunks to a storage port.

In step 318A, MA values of the current I/O workloads, shift per workload sample, for all samples are computed over a duration which can be a tunable, say every hour. In step 318B, the MA values are segregated across the low, medium, and high I/O workload threshold bands with date and time stamps. In step 318C, importance is assigned to the MA values based on the I/O workload threshold band they belong to. In one example embodiment, the importance is assigned to the MA values as shown in the following table. In the table, 'n' can be a tunable value in customer environments depending on how long an I/O load sustains in a specific Band. Additionally, gaps introduced due to discarded samples may be filled with interpolated values based on the highest sample value just before the beginning of the first discarded sample of a gap.

TABLE 2

| MA values in Workload Band | Importance | Remarks |
| --- | --- | --- |
| 0 to Low_Thresh_Band/2 | 0 | All values in this band are ignored to reduce negative bias in trend line |
| Low_Thresh_Band/2 to Low_Thresh_Band | 25% | Lower importance to support trending without major negative influence (e.g., out of every 'n' continuous samples, first 25% in order of descending magnitude of the same are considered for trending and the rest discarded) |
| Low_Thresh_Band to Medium_Thresh_Band/2 | 75% | Higher importance to support trending without major influence (e.g., out of every 'n' continuous samples, first 75% in order of descending magnitude of the same are considered for trending and the rest discarded) |
| Medium_Thresh_Band/2 to Medium_Thresh_Band | 1 | Highest importance: necessary for effective trending, and all samples are considered for trending |
| Entire High_Thresh_Band | 1 | Highest importance: necessary for effective trending, and all samples are considered for trending |

In step 318D, the MA values in the low I/O workload threshold band are filtered i.e. discarded. In step 318E, a regression algorithm is applied over the MA values considered with importance. In step 318F, a difference (threshold_difference) between the current I/O workloads and the respective I/O workload threshold values (WL_threshold) of the subset of the components is computed. In step 318 G, time taken to potentially reach a I/O workload threshold value (mean_time_to_threshold) is computed based on a regression equation determined by the regression algorithm and the computed difference. In step 318H, for the entire MA values which fall on the high I/O workload threshold band, and if the MA values greater than the maximum workload threshold value, the process 300D goes to step 320 of FIG. 3C.

In accordance with the above described embodiments and with reference to FIG. 3D, the smoothing, trending and forecasting techniques are explained in greater detail in the following description. The following are the considerations in analyzing current I/O workloads of the components in the SAN:

I/O workloads of the components in the SAN exhibits characteristics of a cyclic nature during a day, a week or a month, with potentially increasing and sustaining peaks over time. In other words, high sustained I/O workloads may occur during specific periods of hours of time during a day, specific days of a week or a month, with interspersed peak bursts and low I/O workloads or steady medium I/O workloads may occur during other periods of time.

Bursty short period high I/O workload situations are not analyzed by the workload analysis system, since the frequency of monitoring performance statistics is not high.

Influence of the low I/O workloads on a trending process is filtered out by the workload analysis system as potential link saturation situations are only forecasted based on I/O workload threshold values.

The I/O workload analysis is applied on the I/O statistics of all the components in the SAN.

Threshold monitoring is done for the storage ports and the ISLs or trunks. This is a continuous process over hours, day, weeks, and months.

In one embodiment, the trending and forecasting algorithm described below uses a combination of a smoothing technique followed by a trending and forecasting technique as outlined below:

1) A smoothing technique of I/O workloads reduces random fluctuations in the I/O workloads. The smoothing technique uses a MA algorithm for computing MA values, shift per workload sample, for all samples in an hour. The MA values are categorized into the three I/O workload threshold bands as shown in table 1.

2) The regression algorithm is applied on the smoothed MA values of the I/O workloads over a period of time for trending and forecasting. The smoothed MA values are assigned importance, as shown in table 2, before being subject to trending in order to eliminate negative bias in a trend line caused by low I/O workload situations existing for a longer duration. In one exemplary implementation, the importance is assigned to the smoothed MA values based on the I/O workload threshold bands to which the workload samples belongs, as shown in table 2. It is appreciated that the importance percentage can be fine-tuned (e.g., specific to SAN configurations) based on I/O workload characteristics of the SAN and applications on the host device.

Further, the data stored in the workload database is maintained by periodically aggregating and cleaning up the redundant I/O statistics data. It is appreciated that the periodicity of the aggregation and cleanup can be a configurable (e.g., daily basis, hourly basis, monthly basis, etc.). For example, in case of very low I/O statistics on an ISL over several hours and assuming that the I/O statistics remains in the lower half of the low I/O workload threshold band for several hours, the I/O statistics for the ISL for the period of time is discarded from the workload database.

In another example, in case of medium I/O statistics on a storage port over several hours and assuming that the I/O statistics remains in the lower half of the medium I/O workload threshold band for several hours, then only the I/O trend is stored and the actual I/O statistics for the storage port for this period of time is discarded from the workload database.

Figure 4:
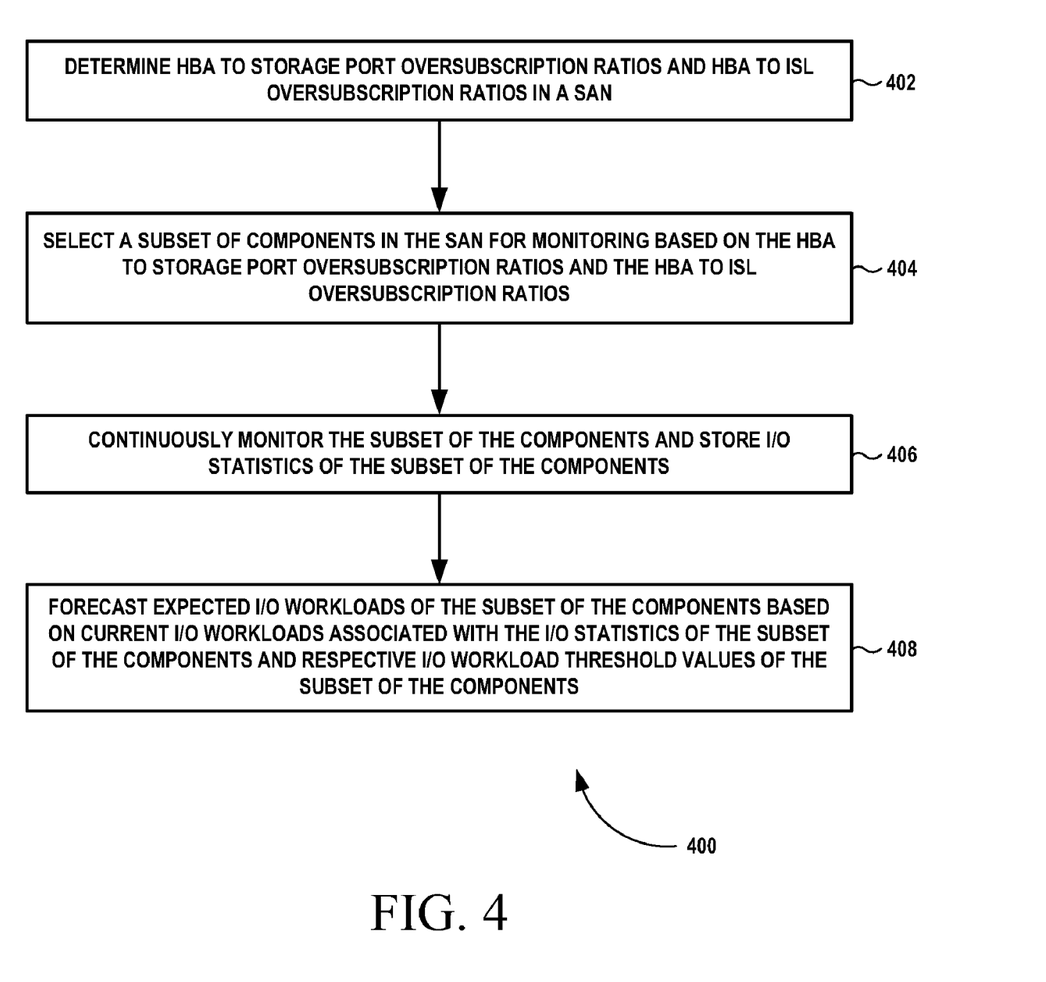
FIG. 4 illustrates a process flow chart of an exemplary method for analyzing input/output (I/O) workloads of components in the SAN of FIG. 1, according to one embodiment.

FIG. 4 illustrates a process flow chart 400 of an exemplary method for analyzing input/output (I/O) workloads of components in a SAN, according to one embodiment. In one example embodiment, the components include a plurality of HBAs, a plurality of switches, and a plurality of storage ports.

In operation 402, HBA to storage port oversubscription ratios and HBA to ISL oversubscription ratios in the SAN are determined. In one exemplary implementation, the HBA to storage port oversubscription ratios and HBA to ISL oversubscription ratios are determined by generating a SAN connectivity map of the components based on scanning of the components and constructing an association and share table of each storage port with LUNs, ISLs, trunks, and HBAs of each host device in the SAN. In one example embodiment, determining the HBA to storage port oversubscription ratios and the HBA to ISL oversubscription ratios include scanning the components for operating data processing rates of the components, and storing the negotiated data rates of the components based on the data processing rates to a database. a. In one embodiment, a HBA to storage port oversubscription ratio ($I_{HBA\ to\ storage\ port}$) and/or a HBA to ISL oversubscription ratio ($I_{HBA\ to\ ISL}$) associated with a host device of the SAN may be calculated using the formulas described in FIG. 2.

In operation 404, a subset of the components in the SAN is selected for monitoring, based on the HBA to storage port oversubscription ratios and the HBA to ISL oversubscription ratios. In operation 406, the subset of the components is continuously monitored and I/O statistics of the subset of the components are stored. In one exemplary implementation, the subset of the components is continuously monitored to obtain the I/O statistics of the subset of the components.

In one example embodiment, continuously monitoring the subset of the components is performed at a sampling rate of 1 minute for a respective component if its HBA to storage port oversubscription ratio or its HBA to ISL oversubscription ratio is greater than 7. In another example embodiment, continuously monitoring the subset of the components is performed by increasing the sampling rate for the respective component if its HBA to storage port oversubscription ratio or its HBA to ISL oversubscription ratio is less than 7.

In operation 408, expected I/O workloads of the subset of the components are forecasted based on current I/O workloads associated with the I/O statistics of the subset of the components and respective I/O workload threshold values of the subset of the components. In one example embodiment, the respective I/O workload threshold values of the subset of the components include a low I/O workload threshold band, a medium I/O workload threshold band and a high I/O workload threshold band. In one embodiment, the monitoring of the subset of the components is performed when respective ones of the subset of the components have its workloads exceeding the low I/O workload threshold band.

In one embodiment, the expected I/O workloads of the subset of the components are obtained by computing differences between the current I/O workloads and the respective I/O workload threshold values of the subset of the components using MA values of relative importance of the current I/O workloads and a regression algorithm of the MA values of the current I/O workloads in an hourly basis. In one example embodiment, the current I/O workloads of the subset of the components are date and time stamped.

Further, forecasting the expected I/O workloads of the subset of the components includes newly performing the determining the HBA to storage port oversubscription ratios and the HBA to ISL oversubscription ratios in the SAN if any of the MA values of an analyzed component is greater than a maximum workload threshold value. In one embodiment, at least one contributing component to the MA values of the analyzed component being greater than the maximum workload threshold value is determined using the association and share table and the current I/O workloads of the at least one contributing component.

Furthermore, forecasting the expected I/O workloads of the subset of the components includes forwarding the subset of the components with the MA values greater than the maximum workload threshold value, its associated mean time to reach the maximum workload threshold value, its associated difference with the maximum workload threshold value, the at least one contributing component, and MA trends of the at least one contributing component. Moreover, in one example embodiment, a computer readable medium for analyzing the I/O workloads of the components in the SAN has instructions that, when executed by a computer, cause the computer to perform the method of FIG. 4.

Figure 5:
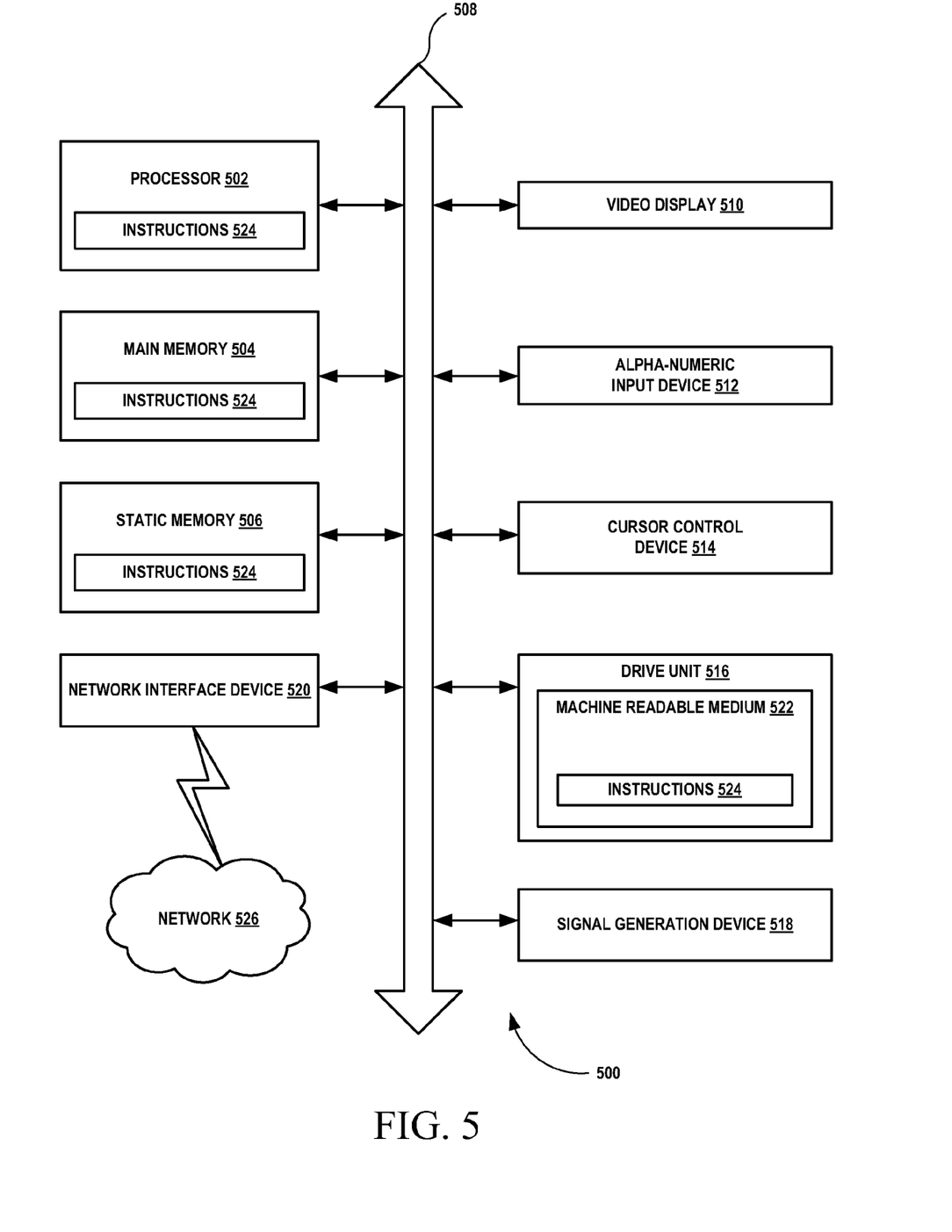
FIG. 5 is a diagrammatic system view of a data processing system in which any of the embodiments disclosed herein may be performed, according to one embodiment.

FIG. 5 is a diagrammatic system view 500 of a data processing system in which any of the embodiments disclosed herein may be performed, according to one embodiment. Particularly, the diagrammatic system view of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524 and a network 526.

The diagrammatic system view 500 may indicate a personal computer and/or a data processing system in which one or more operations disclosed herein are performed. The processor 502 may be a microprocessor, a state machine, an application specific integrated circuit, a field programmable gate array, etc. The main memory 504 may be a dynamic random access memory and/or a primary memory of a computer system. The static memory 506 may be a hard drive, a flash drive, and/or other memory information associated with the data processing system.

The bus 508 may be an interconnection between various circuits and/or structures of the data processing system. The video display 510 may provide graphical representation of information on the data processing system. The alpha-numeric input device 512 may be a keypad, keyboard and/or any other input device of text (e.g., a special device to aid the physically handicapped). The cursor control device 514 may be a pointing device such as a mouse. The drive unit 516 may be a hard drive, a storage system, and/or other longer term storage subsystem.

The signal generation device 518 may be a BIOS and/or a functional operating system of the data processing system. The network interface device 520 may perform interface functions (e.g., code conversion, protocol conversion, and/or buffering) required for communications to and from the network 526 between a number of independent devices (e.g., of varying protocols). The machine readable medium 522 may provide instructions on which any of the methods disclosed herein may be performed. The instructions 524 may provide source code and/or data code to the processor 502 to enable any one or more operations disclosed herein.

The above described technique is an intelligent means of analyzing and forecasting of I/O workloads with focus on specific potential congestion points, based on the SAN configuration analysis and the oversubscription ratios. Also, the designer solutions can proactively provision the SAN, based on the (potential) load points, and contributors to the load in the SAN, to prevent congestion situations, and support better design for effective SAN infrastructure utilization.

The above described technique performs intelligent analysis of I/O trend in the SAN on oversubscribed links over long periods of time at fabric level and storage connectivity level. Further, the above described technique forecasts the storage I/O traffic growth, and helps in planning for the necessary upgrade of the SAN ahead of time. Furthermore, the above described technique detects potential I/O load points that are crossing threshold values before they become acute. Moreover, the above technique looks up and isolates host devices and HBAs contributing to increasing load, and end LUNs which could potentially get affected due to potential performance drop.

"APPENDIX 1" depicts the preliminary format and details associated with the association and share table 212.

"APPENDIX 2" depicts the preliminary format and details associated with the workload database 216.

"APPENDIX 3" depicts the preliminary format and details associated with the threshold database 214.

It will be appreciated that the various embodiments discussed herein may not be the same embodiment, and may be grouped into various other embodiments not explicitly disclosed herein. In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated circuitry (ASIC)).

APPENDIX 1

```
/* Generic structure to store the list of exposed or discovered LUNs */
Struct LUN_List
{
    map<uint64, string>  LUNMap;    // Key-value pair list, where key is the
                                    //LUN # and value is the component key
                                    //of the LU exposed at the given LUN.
}
/* Structure to represent an HBA port */
Struct HBA_Port
{
    string       ComponentKey;    // Unique ID of this port
    string       ParentHBA;       // Component key of the HBA where this
                                  //port resides
```

APPENDIX 1-continued

```
        int         PortNum;
        int         OperatingSpeed;
        array<int>  SupportedSpeeds;
        string      PortWWN;
        string      ConnectedPort;      // Component key of remote port to
                                        //which this port is connected
        map<string, LUN_List> DiscoveredLUNs;  // Key-value pair list, where
                                        //key is the component key of
                                        //the storage port, and value contains
                                        //the list of LUNs exposed by the given
                                        //storage port to this HBA port.
}
/* Structure to represent a switch port */
Struct Switch_Port
{
        string      ComponentKey;       // Unique ID of this port
        string      ParentSwitch;       // Component key of the parent switch
                                        //housing this port
        int         PortNum;
        int         OperatingSpeed;
        array<int>  SupportedSpeeds;
        string      ConnectedPort;      // Component key of remote port to
                                        //which this port is connected
}
/* Structure to represent a storage port */
Struct Storage_Port
{
        string      ComponentKey;       // Unique ID of this port
        string      ParentStorage;      // Component key of the storage array
                                        //where this port resides
        int         PortNum;
        int         OperatingSpeed;
        array<int>  SupportedSpeeds;
        map<string, LUN_List> Exposed_LUNs  // Key-value pair list, where
                                        //key is the component key of the
                                        // HBA port, and value contains the list
                                        //of LUNs exposed by this storage port
                                        //to the given HBA port.
        int         Hosts_HBAs_Stor_Port_Over_Subs;
        array<string>  Contributing_HBAPorts;    // Component keys of all
                                                 //contributing HBA ports
        array<string>  Contributing_ISLs;        // Component keys of all
                                                 //contributing ISLs and ISL trunks
}
/* Structure representing a Logical Unit (LU) */
Struct LU
{
        string      ComponentKey;       // Unique ID of this Logical Unit
        string      ParentStorage;      // Component key of the storage array to
                                        //which this LU belongs
        string      LUWWN;
        array<string>  Connected_Ports;  // Component keys of all storage
                                         //ports exposing this LU
}
/* Structure representing an HBA */
Struct HBA
{
        string      ComponentKey;       // Unique ID of this HBA
        string      ParentHost;         // Component key of the host where this
                                        //HBA resides.
        string      NodeWWN;
        array<HBA_Port>  Port_Array;
}
/* Structure representing a Host */
Struct Host
{
        string      ComponentKey;       // Unique ID of this host
        array<HBA>  HBA_Array;
}
/* Structure representing a Switch */
Struct Switch
{
        string      ComponentKey;       // Unique ID of this switch
        string      ParentFabirc;       // Component key of the fabric to which
                                        //this switch belongs
        array<Switch_Port>  Port_Array;
        array<ISL>  ISL_Array;
        int         Hosts_HBAs_ISL_Over_Subs;
}
```

APPENDIX 1-continued

```
/* Structure representing an ISL or ISL trunk */
Struct ISL
{
    string          ComponentKey;   // Unique ID of this ISL
    string          FromSwitch;     // Component key of switch A to which this ISL
                                    //is connected
    string          ToSwitch;       // Component key of switch B to which this ISL
                                    //is connected
    string          FromPort;       // Component key of port on switch A to which
                                    //this ISL is connected
    string          ToPort;         // Component key of port on switch B to which
                                    //this ISL is connected
    int             TrunkMaster;
    int             TrunkGroup;
}
/* Structure representing a storage array */
Struct Storage
{
    string              ComponentKey;   // Unique ID of this storage array
    array<Storage_Port>  Port_Array;
    array<LU>            LU_Array;
}
/* Structure to represent a zone configuration */
Struct Zone
{
    string          ComponentKey;   // Unique ID for this zone
    string          ParentFabric;   // Component key of the fabric
                                    //configuration containing this zone
                                    //string Zone Name;
    array<string>   Zone_Members;   // List of all members present in the
                                    //zone
}
/* Structure to represent a fabric configuration */
Struct Fabric
{
    string          ComponentKey;   // Unique ID for this fabric configuration
    string          FabricName;
    array<Switch>   Switch_Array;   // List of all switches present in this fabric.
    array<Zone>     Zone_List;      // List of all zones active in the fabric
}
/* Structure housing the share table data */
Struct ShareTable
{
    array<Host>     Host_Array;
    array<Switch>   Switch_Array;
    array<Fabric>   Fabric_Array;
    array<Storage>  Storage_Array;
}
```

APPENDIX 2

```
/* Structure to store I/O statistics collected from SAN */
Struct IO_Statistics
{
    time    Timestamp;      // Date and Time of collection of the I/O statistics
    double  Bytes;          // Monotonously increasing counter of bytes
                            //read/written
    double  BytesRead;      // Monotonously increasing counter of bytes read
    double  BytesWritten;   // Monotonously increasing counter of bytes written
}
/* Structure to store I/O throughput numbers */
Struct IO_Throughput
{
    time    Timestamp;          // Date and Time of collection of the I/O statistics
    double  BytesPerSec;
    double  BytesReadPerSec;
    double  BytesWrittenPerSec;
}
/* Structure to store component statistics */
Struct Component_Statistics
{
    string ComponentKey;    // Unique ID of component for which these
                            //statistics apply
    double Current_Sampling_Interval;  // Default: 2 *
                                       //Lowest_Samp_Interval
    array<IO_Statistics>  RawIOStatistics;  // Raw I/O statistics history for
                                            //component
```

APPENDIX 2-continued

```
    array<IO_Throughput>  IOThroughput;      // I/O throughput history for
                                             //component
    array<IO_Throughput>  MAIOThroughput;  // Moving average I/O
                                             //throughput for component
    int       ThresholdLevel;       // Low || Medium || High
    double    Thresh_Difference;
    double    Mean_Time_To_Threshold;
}
/* Structure containing the workload database */
Struct IO_Workload_Database
{
    array<Component_Statistics>  Component_Array;
    double      Lowest_Samp_Interval;
}
```

APPENDIX 3

```
/* Structure to store threshold related information for a component */
Struct Component_Thresholds
{
    string      ComponentKey;    // Unique ID of SAN component for
                                 // which these thresholds apply
    double    WL_Thresh;         // Current Threshold Value
    double    Low_Thresh_Band_Start;
    double    Low_Thresh_Band_End;
    double    Medium_Thresh_Band_Start;
    double    Medium_Thresh_Band_End;
    double    High_Thresh_Band_Start;
    double    High_Thresh_Band_End;
}
/* Structure housing the threshold database */
Struct Threshold_Database
{
    array<Component_Thresholds>   Component_Array;
}
/* End */
```

What is claimed is:

1. A method for analyzing input/output (I/O) workloads of components in a storage area network (SAN), comprising:
   determining host bus adapter (HBA) port to storage port oversubscription ratios and HBA port to inter-switch link (ISL) oversubscription ratios in the SAN;
   selecting a subset of the components for monitoring based on the HBA to storage port oversubscription ratios and the HBA port to ISL oversubscription ratios;
   continuously monitoring the subset of the components and storing I/O statistics of the subset of the components; and
   forecasting expected I/O workloads of the subset of the components based on current I/O workloads of the subset of the components and respective I/O workload threshold values of the subset of the components, wherein the current I/O workloads are associated with the I/O statistics.

2. The method of claim 1, wherein the components comprise a plurality of HBA ports, a plurality of switches, and a plurality of storage ports.

3. The method of claim 2, wherein the determining the HBA port to storage port oversubscription ratios and HBA port to ISL oversubscription ratios comprises generating a SAN connectivity map of the components based on scanning of the components and constructing an association and share table of each storage port with logical unit numbers (LUNs), ISLs, trunks, and HBA ports of a plurality of host devices in the SAN.

4. The method of claim 3, wherein the expected I/O workloads of the subset of the components are obtained by computing differences between the current I/O workloads and the respective I/O workload threshold values of the subset of the components using moving average (MA) values relative importance of the current I/O workloads and a regression algorithm of the MA values of the current I/O workloads over a specified tunable duration in an hourly basis.

5. The method of claim 4, wherein the forecasting the expected I/O workloads further comprises newly performing the determining the HBA port to storage port oversubscription ratios and the HBA port to ISL oversubscription ratios in the SAN if any of the MA values of an analyzed component is greater than a maximum workload threshold value.

6. The method of claim 5, wherein the forecasting of the expected I/O workloads comprises forwarding at least one of the subset of the components with the MA values greater than the maximum workload threshold value, the subset of the components associated mean time to reach the maximum workload threshold value, the subset of the components associated difference with the maximum workload threshold value, at least one contributing component, and MA trends of the at least one contributing component.

7. The method of claim 1, wherein the determining the HBA port to storage port oversubscription ratios and the HBA port to ISL oversubscription ratios comprises:
   scanning the components for data processing rates of the components; and
   storing the data processing rates and a plurality of negotiated data rates of the components in a database.

8. The method of claim 7, wherein a HBA port to storage port oversubscription ratio ($I_{HBA\ to\ storage\ port}$) associated with a host device of the SAN is calculated by:

$$I_{HBA\ to\ storage\ port} = \frac{\sum_{i=1}^{n}(HPCi*Si)}{\sum_{i=1}^{m}(SPCi*Si)},$$

with the m and n being a number of HBA ports and storage ports with a plurality of different negotiated data rates, the Si being one of the different negotiated data rates, the HPCi being a number of HBA ports operating at the Si, and the SPCi being a number of storage ports operating at the Si.

9. The method of claim 7, wherein a HBA port to ISL oversubscription ratio ($I_{HBA\ to\ ISL}$) associated with a host device is calculated by:

$$I_{HBA\ to\ ISL} = \frac{\sum_{i=1}^{n}(HPCi*Si)}{\sum_{i=1}^{m}(IPCi*Si)},$$

with the m and n being a number of HBA ports and ISLs with a plurality of different negotiated data rates, the Si being one of the different negotiated data rates, the HPCi being a number of HBA ports operating at the Si, and the IPCi being a number of ISLs operating at the Si.

10. The method of claim 1, wherein the respective I/O workload threshold values of the subset of the components comprises a low I/O workload threshold band, a medium I/O workload threshold band, and a high I/O workload threshold band.

11. The method of claim 10, wherein the monitoring of the subset of the components is performed when respective one of the subset of the components has workloads exceeding the low I/O workload threshold band.

12. The method of claim 1, wherein the continuously monitoring the subset of the components is performed by a sampling rate of 1 minute for the monitoring for a respective component if the subset of the components' HBA port to storage port oversubscription ratio or the subset of the components' HBA port to ISL oversubscription ratio is greater than 7, and increasing the sampling rate for the respective component if the subset of the components' HBA port to storage port oversubscription ratio or its HBA port to ISL oversubscription ratio is less than 7.

13. A workload analysis system for analyzing input/output (I/O) workloads of components in a storage area network (SAN), comprising:
   a processor configured to execute code modules, the code modules comprising:
      an oversubscription calculation module for determining host bus adapter (HBA) port to storage port oversubscription ratios and HBA port to ISL oversubscription ratios in the SAN;
      a workload monitoring module for selecting a subset of the components for monitoring based on the HBA port to storage port oversubscription ratios and the HBA port to ISL oversubscription ratios, for continuously monitoring the subset of the components, and for storing I/O statistics of the subset of the components; and
      a workload forecasting module for forecasting expected I/O workloads of the subset of the components based on current I/O workloads of the subset of the components and respective I/O workload threshold values of the subset of the components.

14. The system of claim 13, wherein the oversubscription calculation module, the workload monitoring module, and the workload forecasting module reside in a management station which is communicatively coupled to the SAN.

15. A non-transitory computer readable medium for analyzing input/output (I/O) workloads of components in a storage area network (SAN), comprising code configured to direct a processor to:
   determine host bus adapter (HBA) port to storage port oversubscription ratios and HBA port to inter-switch link (ISL) oversubscription ratios in the SAN;
   select a subset of the components for monitoring based on the HBA port to storage port oversubscription ratios and the HBA port to ISL oversubscription ratios;
   continuously monitor the subset of the components and store I/O statistics of the subset of the components; and
   forecast expected I/O workloads of the subset of the components based on current I/O workloads of the subset of the components and respective I/O workload threshold values of the subset of the components, wherein the current I/O workloads are associated with the I/O statistics.

* * * * *